(12) United States Patent
Wang et al.

(10) Patent No.: US 11,287,164 B2
(45) Date of Patent: Mar. 29, 2022

(54) EVAPORATOR AND BAFFLE THEREOF

(71) Applicant: Carrier Corporation, Palm Beach Gardens, FL (US)

(72) Inventors: Xuedong Wang, Shanghai (CN); Xueqin Wang, Shanghai (CN); Lihui Yang, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/827,869

(22) Filed: Mar. 24, 2020

(65) Prior Publication Data

US 2020/0309425 A1 Oct. 1, 2020

(30) Foreign Application Priority Data

Mar. 28, 2019 (CN) .......................... 201910242657.1

(51) Int. Cl.
*F25B 43/00* (2006.01)
*F25B 39/02* (2006.01)
*B01D 1/30* (2006.01)

(52) U.S. Cl.
CPC .............. *F25B 39/022* (2013.01); *B01D 1/30* (2013.01); *F25B 2339/0241* (2013.01)

(58) Field of Classification Search
CPC ....................... F25B 39/022; F25B 2339/0241
USPC ......................................................... 62/512
See application file for complete search history.

(56) References Cited

U.S. PATENT DOCUMENTS

| | | | |
|---|---|---|---|
| 2,993,565 A * | 7/1961 | Coulter ................. | B01D 45/08 55/440 |
| 4,673,421 A * | 6/1987 | Schwickert ............ | F28C 1/003 55/440 |
| 5,271,753 A * | 12/1993 | Akel ..................... | F22B 37/303 55/436 |
| 5,320,652 A * | 6/1994 | Akel ..................... | F22B 37/322 55/320 |
| 6,860,279 B2 * | 3/2005 | Dunn ..................... | B08B 3/102 134/182 |
| 6,868,695 B1 * | 3/2005 | Dingel .................. | F25B 39/028 165/115 |
| 7,490,476 B2 * | 2/2009 | Max ........................ | C02F 1/22 62/119 |

(Continued)

FOREIGN PATENT DOCUMENTS

CN 203908141 U 10/2014
CN 105953629 A 9/2016
(Continued)

OTHER PUBLICATIONS

European Search Report for Application No. 20165341.7; dated Aug. 6, 2020; 6 Pages.

*Primary Examiner* — Claire E Rojohn, III
(74) *Attorney, Agent, or Firm* — Cantor Colburn LLP

(57) ABSTRACT

An evaporator and a baffle structure thereof are disclosed by the present application. The baffle structure is configured to block liquid droplets in a gas, and includes: a bottom portion extending in a first direction and side portions extending from the bottom portion in a direction intersecting the first direction; and a liquid blocking region provided on the side portions, the liquid blocking region being provided therein with a plurality of holes penetrating the side portions to allow gas to pass through the holes.

9 Claims, 4 Drawing Sheets

(56) References Cited

U.S. PATENT DOCUMENTS

| | | | | |
|---|---|---|---|---|
| 8,774,342 B2* | 7/2014 | Hino | ............... | G21C 19/317 |
| | | | | 376/371 |
| 9,157,690 B2* | 10/2015 | Kreis | ............... | F28F 9/0265 |
| 9,541,314 B2* | 1/2017 | Numata | ............... | F28D 3/02 |
| 9,759,461 B2* | 9/2017 | Numata | ............... | F28D 7/163 |
| 10,612,823 B2* | 4/2020 | Moreaux | ............... | F28F 9/0214 |
| 2009/0049861 A1* | 2/2009 | Luo | ............... | F28D 7/163 |
| | | | | 62/498 |
| 2014/0223936 A1* | 8/2014 | Hartfield | ............... | F28F 13/02 |
| | | | | 62/115 |
| 2015/0168035 A1* | 6/2015 | Kang | ............... | F25B 39/028 |
| | | | | 62/525 |
| 2016/0040917 A1* | 2/2016 | Liu | ............... | F25B 40/02 |
| | | | | 62/117 |
| 2020/0200478 A1* | 6/2020 | Wilson | ............... | F28D 7/16 |
| 2020/0200480 A1* | 6/2020 | Wilson | ............... | F25B 41/00 |

FOREIGN PATENT DOCUMENTS

| | | |
|---|---|---|
| CN | 104848605 B | 11/2017 |
| CN | 108709339 A | 10/2018 |
| DE | 102013010510 A1 | 3/2014 |
| WO | 2019116072 A1 | 6/2019 |

* cited by examiner

EVAPORATOR AND BAFFLE THEREOF

This application claims priority to Chinese Patent Application No. 201910242657.1, filed Mar. 28, 2019, and all the benefits accruing therefrom under 35 U.S.C. § 119, the contents of which in its entirety are herein incorporated by reference.

FIELD OF THE INVENTION

The present application relates to a baffle structure for gas-liquid separation. The present application also relates to an air conditioning device, and more particularly to an evaporator provided with the baffle structure.

BACKGROUND OF THE INVENTION

After passing through a gas-liquid separator, a refrigerant gas evaporated in an evaporator, especially in a flooded evaporator, still entrains a part of liquid droplets. If this part of liquid droplets enters a compressor, it will damage the compressor. Therefore, a liquid blocking device such as a baffle is provided at a suction port of the evaporator to remove the liquid in the gas. When passing through the baffle, the gas may change a path thereof, reduce a flow velocity, and at the same time collide with the baffle. The liquid droplets are attached to the baffle, gather into large liquid droplets during a downward movement along the baffle, and eventually fall under the gravity. The filtered gas leaves the evaporator from the suction port.

Existing devices are not provided with the baffle. When the cooling capacity is increased, the flow velocity of gas increases, and a phenomenon of liquid carryover will occur accordingly, which will cause the capacity of the entire cooling system to be limited due to the liquid carryover problem.

SUMMARY OF THE INVENTION

At least one technical problem to be solved by the present application is to provide a baffle structure that can be used in a cooling system with a high cooling capacity.

The baffle structure involved in the present application includes: a body including a bottom portion extending in a first direction and side portions extending from the bottom portion in a direction intersecting the first direction; and a liquid blocking region provided on the side portions, the liquid blocking region being provided therein with a plurality of holes penetrating the side portions to allow gas to pass through the holes.

In some embodiments, the bottom portion has opposite first end portion and second end portion in the first direction, and the liquid blocking region is further provided at at least one of the first end portion and the second end portion.

In some embodiments, the liquid blocking region is provided throughout the side portions and/or the first end portion and the second end portion. As used herein, "throughout" refers to the range of entire side portions or entire end portions. For the side portion, the range thereof extends from a junction of the side portion and the bottom portion to an edge of the side portion. After the liquid blocking structure is mounted on an air conditioning device, the so-called edge of the side portion is a position where the side portion is connected to the air conditioning device. For the end portion, the range of the liquid blocking region covers at least a junction of the end portion and the bottom portion and an edge where the end portion terminates. In some embodiments, the body has a substantially U-shaped cross-sectional shape.

In some embodiments, an angle between the side portion and the bottom portion is 90° or greater than 90°, and the bottom portion is planar. Thus, the body may be of a "U" shape with a right-angled bend, or an inverted-trapezoid shape. Alternatively, in some other embodiments, the bottom portion is configured into a funnel shape. In this case, the angle between the side portion and the bottom portion may be 90° or greater than 90°.

In some embodiments, the holes in the liquid blocking region have a shape of circle, triangle, rhombus or rectangle; wherein the diameter of the circle ranges from 19 mm to 25 mm; the side length of the triangle ranges from 10 mm to 30 mm; and the side length of the rhombus and rectangle ranges from 10 mm to 50 mm.

In some embodiments, the liquid blocking region is divided into a first section, a second section and a third section in the first direction, wherein the first section and the third section are located on two sides of the second section, and a hole distribution density of the second section is smaller than a hole distribution density of each of the first section and the third section.

In some embodiments, a transverse distance or a vertical distance between adjacent ones of the holes is 15 mm to 45 mm.

In the above terms indicating directions, "the first direction" is a direction in which the body of the baffle structure extends, "transverse" is the horizontal direction when the baffle structure is placed, and "vertical" is the vertical direction.

Another aspect involved in the present application is to provide an evaporator for use in an air conditioning device, which includes: a shell, the shell having an outlet; and the baffle structure described above, wherein the baffle structure is disposed in the shell, so that a refrigerant gas exits through the outlet after passing through the liquid blocking region.

In some embodiments, the shell has a circular cross section, and a ratio of the distance from the bottom portion of the baffle structure to a wall of the shell to the diameter of the shell is 0.2-0.3.

The liquid blocking region provides an improved liquid blocking efficiency. It has been found that the use of a baffle provided with the liquid blocking region according to the present application can avoid the phenomenon of liquid carryover, the cooling capacity can be increased by about 10%, and there is almost no loss in cooling performance.

The refrigerant gas passes through the baffle via the liquid blocking region, and then leaves the device via the suction port. The liquid droplets are blocked outside the baffle. The gas passes through the baffle via the side portions; therefore, providing the liquid blocking region on the side portions is advantageous for blocking liquid droplets in the gas.

The baffle structure involved in the present application is reliable, simple, and easy to machine, and can achieve a good liquid blocking effect.

Other aspects and features of the present application will become apparent from the following detailed description with reference to the drawings. However, it should be understood that the drawings are intended for the purpose of illustration only, rather than defining the scope of the present application, which should be determined with reference to the appended claims. It should also be understood that the drawings are merely intended to conceptually illustrate the structure and flowchart described herein, and it is not necessary to draw the figures to the scale, unless otherwise specified.

BRIEF DESCRIPTION OF THE DRAWINGS

The present application will be more fully understood from the following detailed description of specific embodiments with reference to the drawings, in which identical elements in the views are always denoted by identical reference signs, wherein.

DETAILED DESCRIPTION OF THE EMBODIMENT(S) OF THE INVENTION

To help those skilled in the art precisely understand the subject matter of the present application, specific embodiments of the present application are described in detail below with reference to the accompanying drawings.

Figure 1:
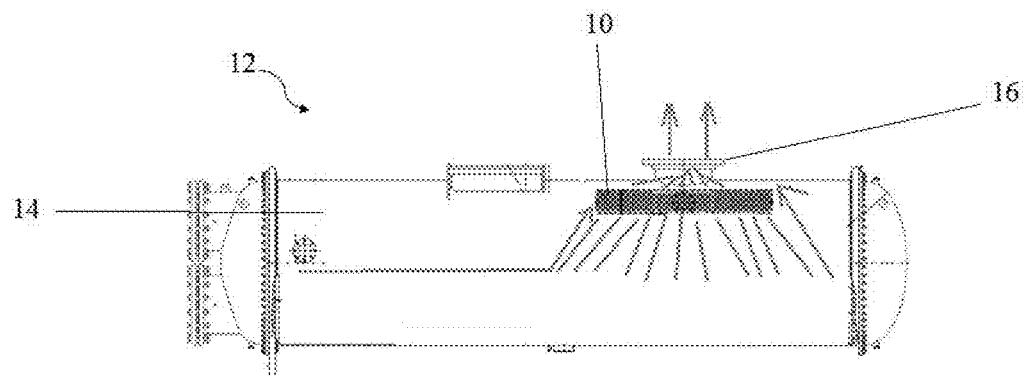
FIG. 1 is a schematic view of an embodiment of an evaporator according to the present application.

The baffle structure involved in the present application is used for an evaporator. In FIG. 1, there is shown an evaporator 12 to which the baffle structure according to the present application is applied. The evaporator 12 has an outlet or a suction port 16 on the top, and a baffle structure 10 is provided below the suction port 16. It can be seen from the figure that the refrigerant gas flows toward the suction port in a direction indicated by arrows and passes through the baffle structure 10 before entering the suction port 16 so that the liquid droplets in the gas are blocked outside the suction port 16. An ideal separation effect can be achieved for the gas in a single filtration step. The baffle structure 10 may be connected to a shell 14 of the evaporator 12 by welding or by other ways that can be conceived.

Figure 2:
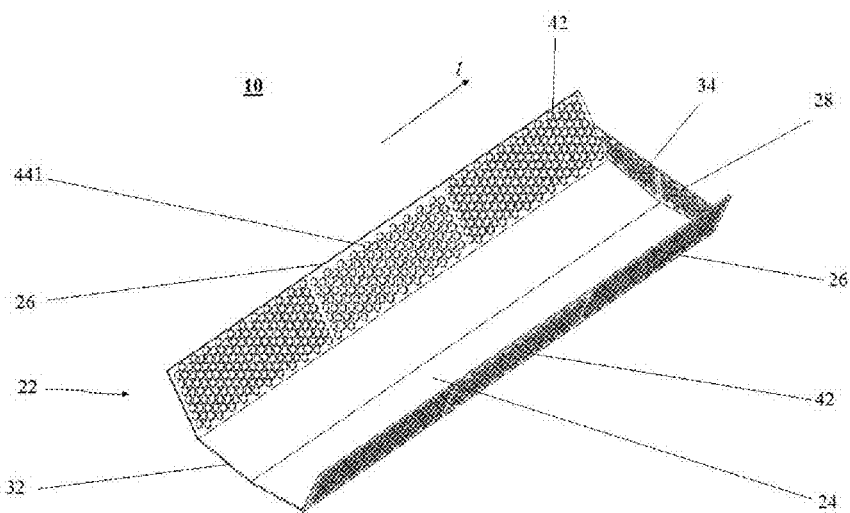
FIG. 2 is a schematic view of an embodiment of a baffle structure according to the present application.

FIG. 2 is a schematic structural view of an embodiment of the baffle structure. The baffle structure includes a body 22 including a bottom portion 24 and side portions 26. The bottom portion 24 extends in a first direction l, and the side portions 26 extends from the bottom portion 24 in a direction intersecting the first direction l. The body 22 has a first end portion 32 and a second end portion 34 in the first direction l, an end plate 28 may be provided on the first end portion 32 and/or the second end portion 34, and the end plate 28 is located between the two side portions 26. The body 22 is further provided with a liquid blocking region 42, and the gas passes through the body 22 via the liquid blocking region 42, and then enters the suction port 16. The liquid blocking region 42 is located on at least one side portion 26.

As shown in the figure, the two side portions 26 is each provided with the liquid blocking region 42. The liquid blocking region 42 may also be disposed on the end plate 28; it may be disposed on both the end plates on the first end portion and the second end portion, or may be disposed on any of the end plates as shown in FIG. 2. Of course, it is also possible to provide no end plate on the body 22.

The liquid blocking region 42 is disposed throughout the side portions 26 and/or the end plates 28. In the illustrated embodiment, the liquid blocking region 42 covers the entire side portions 26, so most of the gas needs to escape the evaporator 12 through the liquid blocking region 42. The liquid blocking region 42 is provided therein with a plurality of holes 441 that allow the gas to pass through and can trap liquid droplets. These holes 441 are through holes and have a certain hole distribution density, so that when the gas passes, it is blocked by a wide range of the liquid blocking region 42 and the flow velocity thereof is reduced, which is advantageous for blocking liquid droplets in the gas outside the holes. This arrangement can reduce the flow velocity of the refrigerant so that a gas-liquid separation rate is improved, and at the same time does not affect the passage of a large amount of refrigerant, thereby ensuring a cooling capacity of the device. Hole distribution in the liquid blocking region will be described later.

Figure 3:
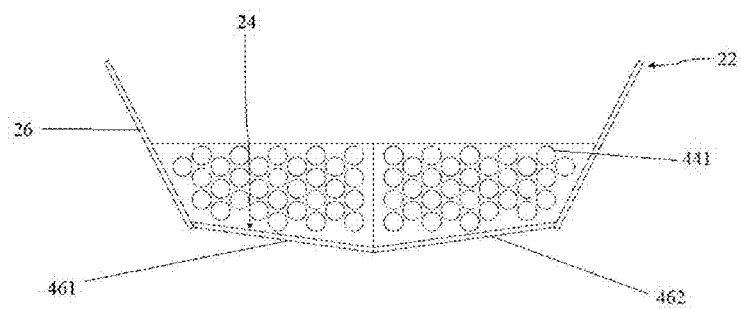
FIG. 3 is a sectional view of the baffle structure in FIG. 2.
Figure 4:
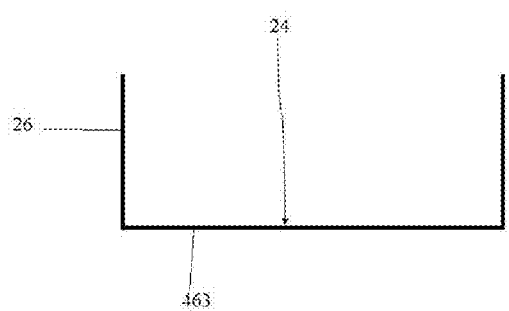
FIG. 4 is a schematic view of the baffle structure according to the present application having another embodiment of the section.
Figure 5:
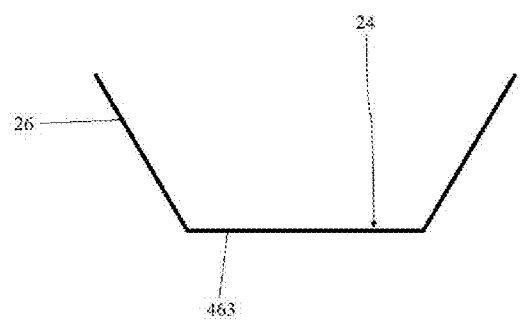
FIG. 5 is a schematic view of the baffle structure according to the present application having further another embodiment of the section.

The body 22 may have various cross-sectional shapes depending on a positional relationship and shapes of the bottom portion 24 and the side portions 26. The cross section is substantially U-shaped, and the bottom portion 24 may be planar, or folded-line shaped or arc-shaped. Taking the bottom portion 24 in the folded-line shape as an example, as shown in FIG. 3, the bottom portion 24 is configured into a funnel shape, that is, the bottom portion 24 has two planes 461 and 462, and the two planes 461 and 462 have a large included angle therebetween. Alternatively, as shown in FIGS. 4 and 5, the bottom portion 24 is a plane 463, and the angle between the side portion 26 and the plane 463 is 90°, as shown in FIG. 4; or the bottom portion 24 is a plane 463, and the angle between the side portion 26 and the plane 463 is greater than 90°, see FIG. 5.

Figure 6:
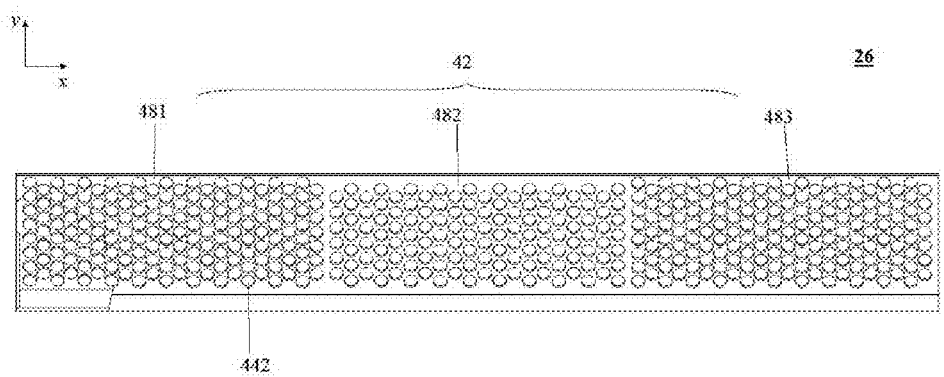
FIG. 6 is a schematic view of an embodiment of side portions of the baffle structure according to the present application.

The hole distribution of the liquid blocking region 42 includes a plurality of holes 441 designed to be densely arranged. The holes may be arranged in a certain way to be filled throughout the liquid blocking region in a hole array. The shape of the holes may be various, such as a shape of circle, triangle, rhombus, rectangle and oblong (also called a racetrack shape). The size of the holes is also determined by design. For circular holes, the diameter thereof ranges from 19 mm to 25 mm; for triangular holes, the side length thereof ranges from 10 mm to 30 mm; for rhombus and rectangular holes, the side length thereof ranges from 10 mm to 50 mm; and for detailed sizes of oblong holes, reference may be made to the above-mentioned size range. A transverse distance or vertical distance between adjacent holes is 15 mm to 45 mm. The "transverse" and "vertical" as used herein refer to the horizontal direction x and the vertical direction y when the side portion or the end portion is viewed separately. As shown in FIG. 6, a hole array is neatly distributed in the liquid blocking region 42 of the side portion 26, and the transverse distance and the vertical distance between two adjacent holes satisfy the above range.

Figure 7:
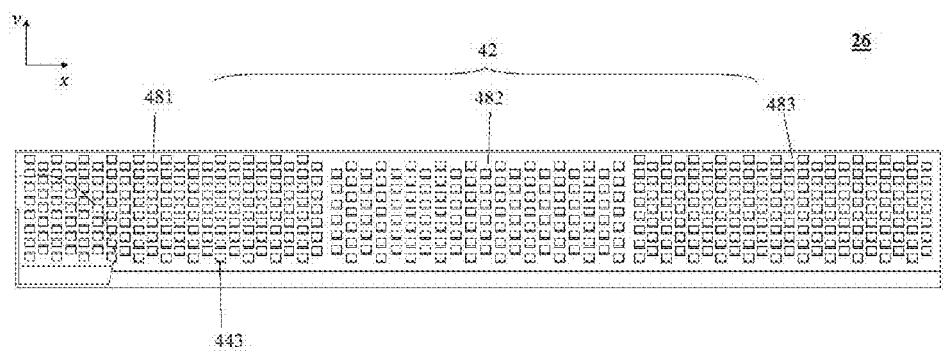
FIG. 7 is a schematic view of another embodiment of side portions of the baffle structure according to the present application.

The side portion shown in FIG. 6 is based on a hole array of circular holes 442, and the side portion shown in FIG. 7 is based on a hole array of rectangular holes 443. With continued reference to FIGS. 6 and 7, the liquid blocking region 42 on the side portion 26 is further divided into a first section 481, a second section 482, and a third section 483, each of which has a hole array at a certain hole distribution density. Moreover, it can be seen that the hole distribution density of the second section 482 in the middle is smaller than that of each of the first section 481 and the third section 483 on two sides of the second section 482, that is, the holes in the middle section are sparsely distributed. This depends on the position of the side portion relative to the suction port. The suction generated near the suction port is relatively large, so the holes are arranged relatively sparsely there, which is advantageous for the passage of refrigerant gas through the liquid blocking region. In contrast, denser holes may be arranged in the liquid blocking region farther away from the suction port, that is, the distance between the holes is smaller, which is not only advantageous for the passage of refrigerant gas, but also balances the passage volumes of gas in several sections without affecting the gas flow. Of course, the liquid blocking region is not limited to being divided into three sections, and there may be more or fewer sections. The hole distribution density of each section in the liquid blocking region is not limited to the above arrangement, and the hole distribution density of each section may be determined according to the design requirements. The hole distribution densities of the sections may be the same or different.

Figure 8:
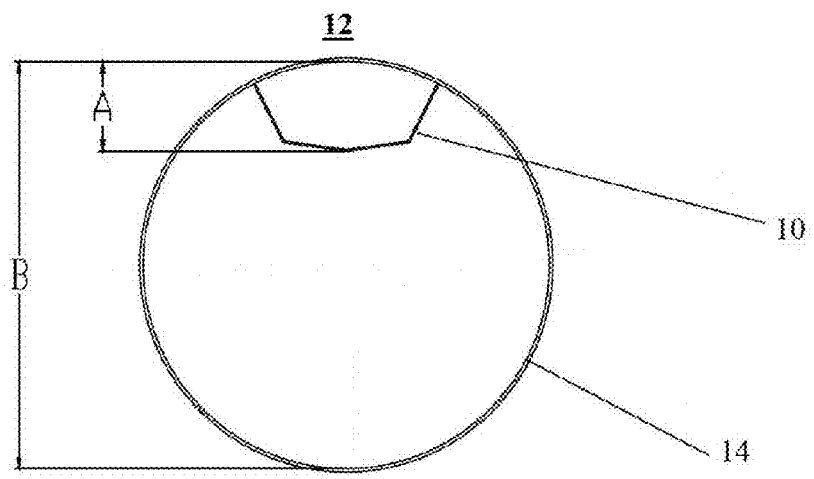
FIG. 8 is a schematic sectional view of the evaporator according to the present application.

Referring to FIG. 8, the evaporator 12 has a cylindrical shell 14. When the baffle structure 10 is mounted on the shell 14, the size of a vertical distance from the lowest position of the baffle structure 10 to the shell is A. The size of the diameter of the shell is B. The ratio A/B of the two is about 0.2 to 0.3. As shown, when the bottom portion is funnel-shaped, the bend is the lowest position of the baffle structure, and therefore A/B refers to the ratio of the distance from this position to the shell to the diameter of the shell.

The baffle structure is not limited to being used in the suction port of the evaporator, but may also be used in suction ports/outlets/escape ports of other air conditioning devices or heat exchange devices that require gas-liquid separation, and may be mounted near the outlet. Since the baffle structure of the present application has a good liquid blocking effect, the refrigerant gas can leave the device directly via the suction port after passing through the baffle structure.

While the specific embodiments of the present application have been shown and described in detail to illustrate the principles of the application, it should be understood that the present application can be implemented in other ways without departing from the principles.

What is claimed is:

1. A baffle structure configured to block liquid droplets in a gas, comprising:
    a body comprising a bottom portion extending in a first direction and side portions extending from the bottom portion in a direction intersecting the first direction; and
    a liquid blocking region provided on the side portions, the liquid blocking region being provided therein with a plurality of holes penetrating the side portions to allow gas to pass through the holes;
    wherein the liquid blocking region in the side portions is divided into a first section and a second section in the first direction;
    wherein a hole distribution density of the second section is smaller than a hole distribution density of the first section;
    wherein the liquid blocking region in the side portions is divided into the first section, the second section and a third section in the first direction, the first section and the third section are located on two sides of the second section, and a hole distribution density of the second section is smaller than a hole distribution density of each of the first section and the third section.

2. The baffle structure according to claim 1, wherein the bottom portion has opposite first end portion and second end portion in the first direction, and the liquid blocking region is further provided at at least one of the first end portion and the second end portion.

3. The baffle structure according to claim 2, wherein the liquid blocking region is provided throughout the first end portion and the second end portion.

4. The baffle structure according to claim 1, wherein the body has a U-shaped cross-sectional shape.

5. The baffle structure according to claim 4, wherein an angle between the side portion and the bottom portion is 90° or greater than 90°, and the bottom portion is planar or the bottom portion is configured into a funnel shape.

6. The baffle structure according to claim 1, wherein the holes in the liquid blocking region have a shape of circle, triangle, rhombus or rectangle; the diameter of the circle ranges from 19 mm to 25 mm; the side length of the triangle ranges from 10 mm to 30 mm; and the side length of the rhombus and rectangle ranges from 10 mm to 50 mm.

7. The baffle structure according to claim 1, wherein a transverse distance or a vertical distance between adjacent ones of the holes is 15 mm to 45 mm.

8. An evaporator for use in an air conditioning device, comprising:
    a shell (14), the shell having an outlet (16); and
    the baffle structure according to claim 1, wherein the baffle structure (10) is disposed in the shell, so that a refrigerant gas exits through the outlet after passing through the liquid blocking region (42).

9. The evaporator according to claim 8, wherein the shell has a circular cross section, and a ratio of a distance from the bottom portion of the baffle structure to a wall of the shell to the diameter of the shell is 0.2-0.3.

* * * * *